(12) United States Patent
Abrishamkar et al.

(10) Patent No.: US 8,774,261 B2
(45) Date of Patent: Jul. 8, 2014

(54) SOFT LINEAR AND NON-LINEAR INTERFERENCE CANCELLATION

(75) Inventors: Farrokh Abrishamkar, San Diego, CA (US); Divaydeep Sikri, Farnborough (GB); Ken Delgado, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 25 days.

(21) Appl. No.: 13/493,203

(22) Filed: Jun. 11, 2012

(65) Prior Publication Data

US 2013/0148711 A1    Jun. 13, 2013

Related U.S. Application Data

(60) Provisional application No. 61/548,093, filed on Oct. 17, 2011, provisional application No. 61/577,498, filed on Dec. 19, 2011.

(51) Int. Cl.
*H03H 7/30* (2006.01)

(52) U.S. Cl.
USPC ......... 375/232; 342/151; 704/256.1; 708/323

(58) Field of Classification Search
None
See application file for complete search history.

(56) References Cited

U.S. PATENT DOCUMENTS

| | | |
|---|---|---|
| 2010/0046682 A1 | 2/2010 | Sikri et al. |
| 2011/0312275 A1 | 12/2011 | Canpolat et al. |

OTHER PUBLICATIONS

Cirpan H. A. et al., "Stochastic maximum likelihood methods for semi-blind channel equalization", Conference Record of the Thirty-First Asilomar Conference on Signals, Systems & Computers, Nov. 2, 1997, pp. 1629-1632, vol. 2, IEEE Computer Society, US, XP032140447, DOI: 10.1109/ACSSC.1997.679178, ISBN: 978-0-8186-8316-9.
International Search Report and Written Opinion—PCT/US2012/060657—ISA/EPO—Jan. 3, 2013
Nguyen H., et al., "Blind and semi-blind equalization of CPM signals with the EMV algorithm", IEEE Transactions on Signal Processing, Oct. 1, 2003, pp. 2650-2664, vol. 51, No. 10, IEEE Service Center, New York, NY, US, XP011101073, ISSN: 1053-587X, DOI: 10.1109/TSP.2003.816876.
Zeng, H.H., et al., "Improved Spatial-Temporal Equalization for EDGE: A Fast Selective-Direction MMSE Timing Recovery Algorithm and Two-Stage Soft-Output Equalizer", IEEE Transactions on Communications, Dec. 1, 2001, pp. 2124-2134, vol. 49, No. 12, IEEE Service Center, Piscataway, NJ, USA, XP011010093, ISSN: 0090-6778.
Zhao, X., et al., "Coding-Assisted Blind MIMO Separation and Decoding", IEEE Transactions on Vehicular Technology, Nov. 1, 2010, pp. 4408-4417, vol. 59, No. 9, IEEE Service Center, Piscataway, NJ, US, XP011316580, ISSN: 0018-9545.
Anton-Haro, et al., "Application of Hidden Markov Models to Blind Channel Estimation and Data Detection in a GSM Environment," Dept. of Signal Theory and Communications, Universitat Politecnica de Catalunya, Spain, http://www.eurasip.org/Proceedings/Eusipco/1996/paper/eii_5.pdf, pp. 1-4, year 1996.

(Continued)

*Primary Examiner* — Adolf DSouza
(74) *Attorney, Agent, or Firm* — Donald C. Kordich

(57) ABSTRACT

A two stage interference cancellation (IC) process includes a linear IC stage that suppresses co-channel interference (CCI) and adjacent channel interference (ACI). The linear IC stage disambiguates otherwise super-trellis data for non-linear cancellation. Soft linear IC processing is driven by a-posteriori probability (Apop) information. A second stage performs expectation maximization/Baum Welch (EM-BW) processing that reduces residual ISI left over from the first stage and also generates the Apop which drives the soft linear IC in an iterative manner.

13 Claims, 9 Drawing Sheets

(56) References Cited

OTHER PUBLICATIONS

Anton-Haro, et al., "Blind Channel Estimation and Data Detection Using Hidden Markov Models," IEEE Transactions on Signal Processing, pp. 241-247, vol. 45, No. 1, Jan. 1997.

Anton-Haro, et al., "On the Inclusion of Channel's Time Dependence in a Hidden Markov Model for Blind Channel Estimation," IEEE Transactions on Vehicular Technology, pp. 867-873, vol. 50, No. 3, May 2001.

Chen, et al., "Semi-blind Block Channel Estimation and Signal Detection Using Hidden Markov Models," IEEE, pp. 1051-1055, -7803-6451-1, year 2000.

SOFT LINEAR AND NON-LINEAR INTERFERENCE CANCELLATION

CROSS REFERENCE TO RELATED APPLICATION

This application claims the benefit under 35 U.S.C. §119 (e) to U.S. Provisional Patent Application No. 61/548,093 entitled "Soft Linear and Non-Linear Interference Cancellation," filed on Oct. 17, 2011, and to U.S. Provisional Patent Application No. 61/577,498 entitled "Soft Linear and Non-Linear Interference Cancellation," filed on Dec. 19, 2011, the disclosure of which is expressly incorporated by reference herein in its entirety.

TECHNICAL FIELD

Aspects of the present disclosure relate generally to wireless communication systems, and more particularly to interference cancellation at a receiver.

BACKGROUND

Wireless communication networks are widely deployed to provide various communication services such as voice, video, packet data, messaging, broadcast, etc. These wireless networks may be multiple-access networks capable of supporting multiple users by sharing the available network resources. A wireless communication network may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance the UMTS technologies not only to meet the growing demand for mobile broadband access, but to advance and enhance the user experience with mobile communications.

In many communication systems utilizing LTE, GSM, GPRS, EDGE or the like, a receiver's ability to properly decode a received signal depends upon the receiver's ability to effectively suppress co-channel interference (CCI) and inter-symbol interference (ISI). As wireless communications become ever more prevalent, however, increasing amounts of co-channel interference and inter-symbol interference can negatively affect a receiver's ability to suppress interference.

SUMMARY

One aspect of the present disclosure includes a communication receiver configured to perform a two stage interference cancellation (IC) process in which soft linear IC processing is driven by a-posteriori probability (Apop) information. The two stage IC process includes a linear IC stage, which suppresses co-channel interference (CCI) and adjacent channel interference (ACI). The linear IC stage disambiguates otherwise super-trellis data for non-linear cancellation. A second stage performs expectation maximization/Baum Welch (EM-BW) processing which reduces residual inter-symbol interference (ISI) left over from the first stage. The EM-BW processing generates the Apop which drives the soft linear IC in an iterative manner.

A communication receiver according to an aspect of the present disclosure includes a first equalizer section configured to operate on a first portion of a received signal received over a channel to produce a first equalized signal and a first estimate of the channel, and a soft linear estimator section configured to operate on the first equalized signal to produce a second equalized signal. The soft linear estimator section includes a Hidden Markov Model (HMM) estimator.

A signal reception method according to one aspect of the present disclosure includes processing a first portion of a received signal received over a channel to produce a first equalized signal and a first estimate of the channel and performing a soft linear estimation on the first equalized signal to produce a second equalized signal using a Hidden Markov Model (HMM) estimator.

A signal reception apparatus according to an aspect of the present disclosure includes means for processing a first portion of a received signal received over a channel to produce a first equalized signal and a first estimate of the channel and means for performing a soft linear estimation on the first equalized signal to produce a second equalized signal using a Hidden Markov Model (HMM) estimator.

A system for wireless communication according to an aspect of the disclosure includes a memory and at least one processor coupled to the memory. The processor(s) is configured to process a first portion of a received signal received over a channel to produce a first equalized signal and a first estimate of the channel and to perform a soft linear estimation on the first equalized signal to produce a second equalized signal using a Hidden Markov Model (HMM) estimator.

Other configurations of the subject technology should become readily apparent to those skilled in the art from the following detailed description. Various configurations of the technology are shown and described by way of illustration. It should be understood to those skilled in the art that the present disclosure is capable of other and different configurations and its several details are capable of modification in various other respects, without departing from the scope of the technology. Accordingly, the drawings and detailed description should be regarded as illustrative in nature and not as restrictive.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as Code Division Multiple Access (CDMA), Time Division Multiple Access (TDMA), Frequency Division Multiple Access (FDMA), Orthogonal Frequency Division Multiple Access (OFDMA), Single-Carrier Frequency Division Multiple Access (SC-FDMA) and other networks. The terms "network" and "system" are often used interchangeably. A CDMA network may implement a radio technology, such as Universal Terrestrial Radio Access (UTRA), Telecommunications Industry Association's (TIA's) CDMA2000®, and the like. The UTRA technology includes Wideband CDMA (WCDMA) and other variants of CDMA. The CDMA2000® technology includes the IS-2000, IS-95 and IS-856 standards from the Electronics Industry Alliance (ETA) and TIA. A TDMA network may implement a radio technology, such as Global System for Mobile Communications (GSM). An OFDMA network may implement a radio technology, such as Evolved UTRA (E-UTRA), Ultra Mobile Broadband (UMB), IEEE 802.11 (Wi-Fi), IEEE 802.16 (WiMAX), IEEE 802.20, Flash-OFDMA, and the like. The UTRA and E-UTRA technologies are part of Universal Mobile Telecommunication System (UMTS). 3GPP Long Term Evolution (LTE) and LTE-Advanced (LTE-A) are newer releases of the UMTS that use E-UTRA. UTRA, E-UTRA, UMTS, LTE, LTE-A and GSM are described in documents from an organization called the "3rd Generation Partnership Project" (3GPP). CDMA2000® and UMB are described in documents from an organization called the "3rd Generation Partnership Project 2" (3GPP2). The techniques described herein may be used for the wireless networks and radio access technologies mentioned above, as well as other wireless networks and radio access technologies. For clarity, certain aspects of the techniques are described below for LTE or LTE-A (together referred to in the alternative as "LTE/-A") and use such LTE/-A terminology in much of the description below.

Figure 1:
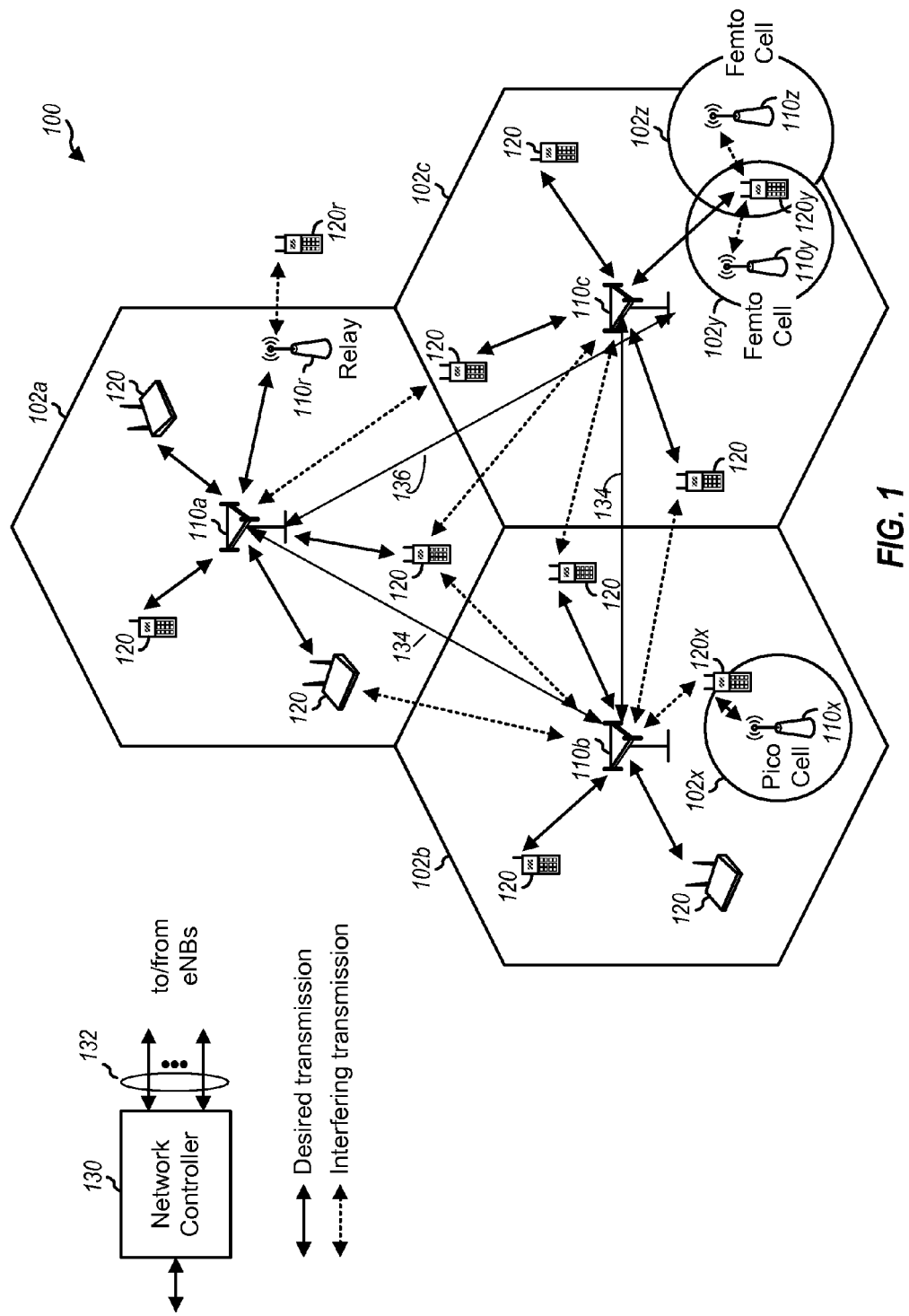
FIG. 1 is a block diagram conceptually illustrating an example of a telecommunications system.

FIG. 1 shows a wireless communication network 100, which may be an LTE-A network, configured to perform interference cancellation according to aspects of the present disclosure. The wireless network 100 includes a number of evolved node Bs (eNodeBs) 110 and other network entities. An eNodeB may be a station that communicates with the UEs and may also be referred to as a base station, a node B, an access point, and the like. Each eNodeB 110 may provide communication coverage for a particular geographic area. In 3GPP, the term "cell" can refer to this particular geographic coverage area of an eNodeB and/or an eNodeB subsystem serving the coverage area, depending on the context in which the term is used.

An eNodeB may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNodeB for a macro cell may be referred to as a macro eNodeB. An eNodeB for a pico cell may be referred to as a pico eNodeB. And, an eNodeB for a femto cell may be referred to as a femto eNodeB or a home eNodeB. In the example shown in FIG. 1, the eNodeBs 110a, 110b and 110c are macro eNodeBs for the macro cells 102a, 102b and 102c, respectively. The eNodeB 110x is a pico eNodeB for a pico cell 102x. And, the eNodeBs 110y and 110z are femto eNodeBs for the femto cells 102y and 102z, respectively. An eNodeB may support one or multiple (e.g., two, three, four, and the like) cells.

The wireless network 100 may also include relay stations. A relay station is a station that receives a transmission of data and/or other information from an upstream station (e.g., an eNodeB, UE, etc.) and sends a transmission of the data and/or other information to a downstream station (e.g., a UE or an eNodeB). A relay station may also be a UE that relays transmissions for other UEs. In the example shown in FIG. 1, a relay station 110r may communicate with the eNodeB 110a and a UE 120r in order to facilitate communication between the eNodeB 110a and the UE 120r. A relay station may also be referred to as a relay eNodeB, a relay, etc.

The wireless network 100 may be a heterogeneous network that includes eNodeBs of different types, e.g., macro eNodeBs, pico eNodeBs, femto eNodeBs, relays, etc. These different types of eNodeBs may have different transmit power levels, different coverage areas, and different impact on interference in the wireless network 100. For example, macro eNodeBs may have a high transmit power level (e.g., 20 Watts) whereas pico eNodeBs, femto eNodeBs and relays may have a lower transmit power level (e.g., 1 Watt).

A network controller 130 may couple to a set of eNodeBs 110 and provide coordination and control for these eNodeBs 110. The network controller 130 may communicate with the eNodeBs 110 via a backhaul. The eNodeBs 110 may also communicate with one another, e.g., directly or indirectly via a wireless backhaul or a wireline backhaul.

The UEs 120 (e.g., UE 120x, UE 120y, etc.) are dispersed throughout the wireless network 100, and each UE may be stationary or mobile. A UE may also be referred to as a terminal, a user terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a netbook, a smart book, or the like. A UE may be able to communicate with macro eNodeBs, pico eNodeBs, femto eNodeBs, relays, and the like. In FIG. 1, a solid line with double arrows indicates desired transmissions between a UE and a serving eNodeB, which is an eNodeB designated to serve the UE on the downlink and/or uplink. A dashed line with double arrows indicates interfering transmissions between a UE and an eNodeB.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for a corresponding system bandwidth of 1.25, 2.5, 5, 10 or 20 megahertz (MHz), respectively. The system bandwidth may also be partitioned into sub-bands. For example, a sub-band may cover 1.08 MHz (i.e., 6 resource blocks), and there may be 1, 2, 4, 8 or 16 sub-bands for a corresponding system bandwidth of 1.25, 2.5, 5, 10, 15 or 20 MHz, respectively.

Figure 2:
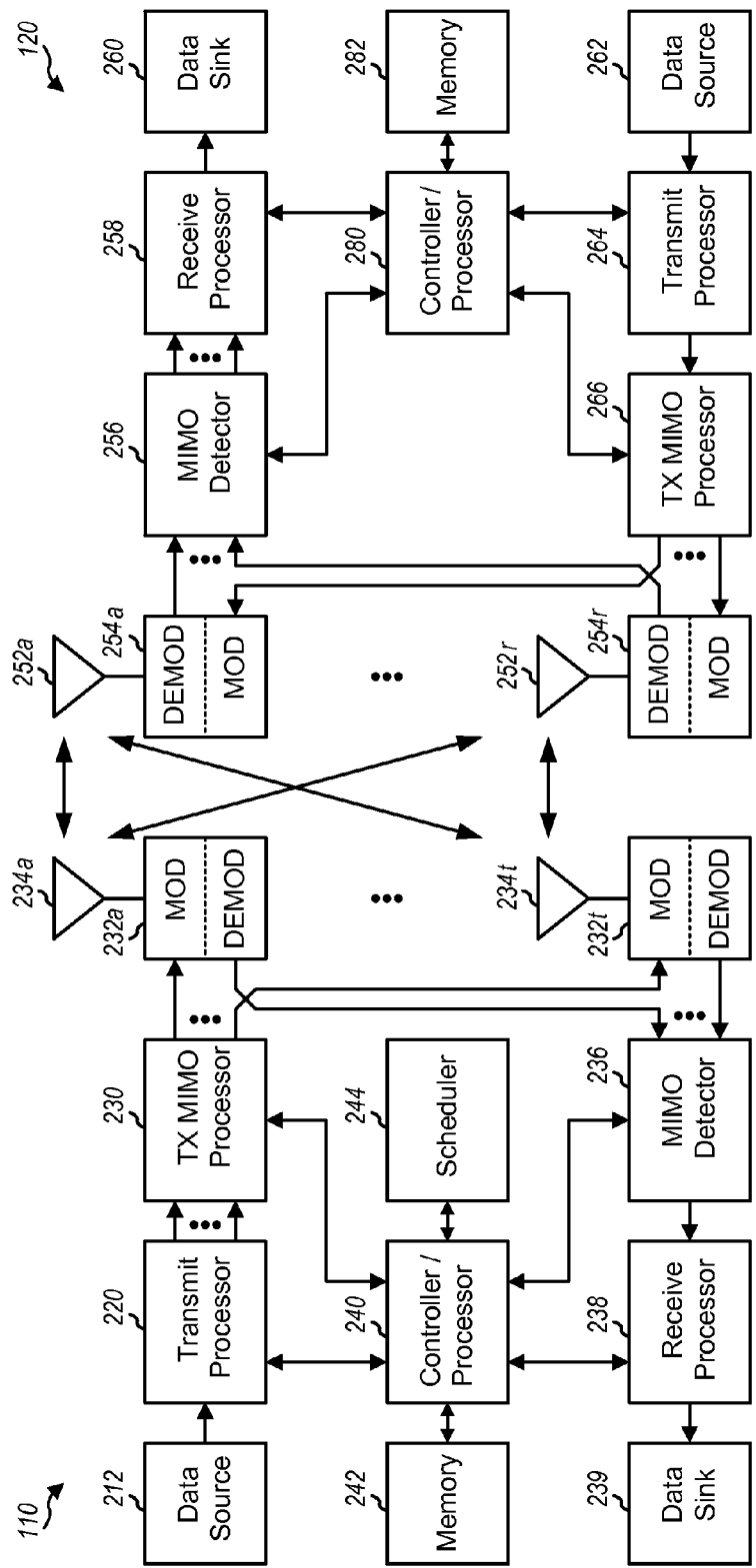
FIG. 2 is a block diagram conceptually illustrating a design of a base station/eNodeB and a UE configured according to an aspect of the present disclosure.

FIG. 2 shows a block diagram of a design of a base station/eNB 110 and a UE 120, which may be one of the base stations/eNBs and one of the UEs in FIG. 1. The base station 110 may be the macro eNB 110c in FIG. 1, and the UE 120 may be the UE 120y. The base station 110 may also be a base station of some other type. The base station 110 may be equipped with antennas 234a through 234t, and the UE 120 may be equipped with antennas 252a through 252r.

At the base station 110, a transmit processor 220 may receive data from a data source 212 and control information from a controller/processor 240. The processor 220 may process (e.g., encode and symbol map) the data and control information to obtain data symbols and control symbols, respectively. The processor 220 may also generate reference symbols, e.g., for the PSS, SSS, and cell-specific reference signal. A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232a through 232t may be transmitted via the antennas 234a through 234t, respectively.

At the UE 120, the antennas 252a through 252r may receive the downlink signals from the base station 110 and may provide received signals to the demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from the demodulators 254a through 254r, perform MIMO detection on the received symbols if applicable, and provide detected symbols. A receive processor 258 may process (e.g., demodulate, deinterleave, and decode) the detected symbols, provide decoded data for the UE 120 to a data sink 260, and provide decoded control information to a controller/processor 280.

On the uplink, at the UE 120, a transmit processor 264 may receive and process data from a data source 262 and control information from the controller/processor 280. The processor 264 may also generate reference symbols for a reference signal. The symbols from the transmit processor 264 may be precoded by a TX MIMO processor 266 if applicable, further processed by the demodulators 254a through 254r (e.g., for SC-FDM, etc.), and transmitted to the base station 110. At the base station 110, the uplink signals from the UE 120 may be received by the antennas 234, processed by the modulators 232, detected by a MIMO detector 236 if applicable, and further processed by a receive processor 238 to obtain decoded data and control information sent by the UE 120. The processor 238 may provide the decoded data to a data sink 239 and the decoded control information to the controller/processor 240.

The controllers/processors 240 and 280 may direct the operation at the base station 110 and the UE 120, respectively. The processor 240 and/or other processors and modules at the base station 110 may perform or direct the execution of various processes for the techniques described herein. The processor 280 and/or other processors and modules at the UE 120 may also perform or direct the execution of the functional blocks illustrated in FIG. 5, and/or other processes for the techniques described herein. The memories 242 and 282 may store data and program codes for the base station 110 and the UE 120, respectively. A scheduler 244 may schedule UEs for data transmission on the downlink and/or uplink.

In one configuration, the base station 110 and/or the UE 120 includes means for implementing multi-point linear equalization (MEQ) techniques for suppression of inter-symbol interference (ISI) according to aspects of the present disclosure. Parallel inter-symbol interference cancellation using hidden Markov model (HMM) techniques provide signal conditioning with ISI and also provide a soft metric for the decoder. According to one aspect of the disclosure, the HMM techniques include expectation maximization/Baum Welch (EM-BW) algorithms.

Receivers operating in accordance with certain wireless standards, such as LTE and GERAN, often receive signals over a channel that may be characterized as a fading channel. Operation of a receiver involves receiving a signal, extracting symbols from the received signal and demodulating the symbols to produce data bits. To help produce the data accurately, a receiver may also suppress or remove signal distortions caused by the communication channel, noise, and interference from unwanted transmitters, for example. Receivers are often designed based on assumptions about communication channels (e.g., assuming that a communication channel has a finite impulse response of a certain duration) and noise signal (e.g., assuming that noise has a white spectrum). Based on the assumptions, a practitioner of the art may configure a receiver to suppress the signal distortions by performing channel equalization using, for example, maximum likelihood (ML) detection, decision feedback equalization (DFE), minimum least squares estimate (MLSE) and other well-known algorithms. While algorithms such as the MLSE may provide good results in many applications, MLSE tends to be computationally expensive, making it an unattractive option for implementation at a resource-limited wireless device. Furthermore, computational complexity of the MLSE algorithm increases non-linearly with increasing constellation density of the received signals. Therefore, in communications network that use higher order modulation schemes (e.g., 8 phase shift keying (8PSK)), a channel equalization and/or an interference suppression technique that is computationally less expensive than MLSE is desirable. Channel equalization techniques using MLSE are generally called "non-linear" channel equalization techniques in the art. Other techniques such as channel equalization using a liner combiner are generally called "linear" channel equalization techniques.

In certain aspects, configurations of the present disclosure provide methods and systems wherein channel equalization and interference suppression may be performed using a soft linear technique such as a soft linear combiner. In one aspect, such architecture is advantageous for a receiver expected to receive signals with different modulation schemes in the same network. For example, the GERAN Evolution standard uses modulation schemes including Gaussian minimum shift keying (GMSK), quadrature phase shift keying (QPSK), 8 phase shift keying (8PSK), 16-quadrature amplitude modulation (16-QAM) and 32-quadrature amplitude modulation (32-QAM).

One aspect of the present disclosure includes a communication receiver configured to perform a two stage interference cancellation (IC) process in which soft linear IC processing is driven by a-posteriori probability (Apop) information. The two stage IC process includes a linear IC stage, which suppresses co-channel interference (CCI) and adjacent channel interference (ACI). The linear IC stage disambiguates otherwise super-trellis data for non-linear cancellation. A second stage performs expectation maximization/Baum Welch (EM-BW) processing which reduces residual ISI left over from the first stage. The EM-BW processing generates the Apop which drives the soft linear IC in an iterative manner.

Figure 3:
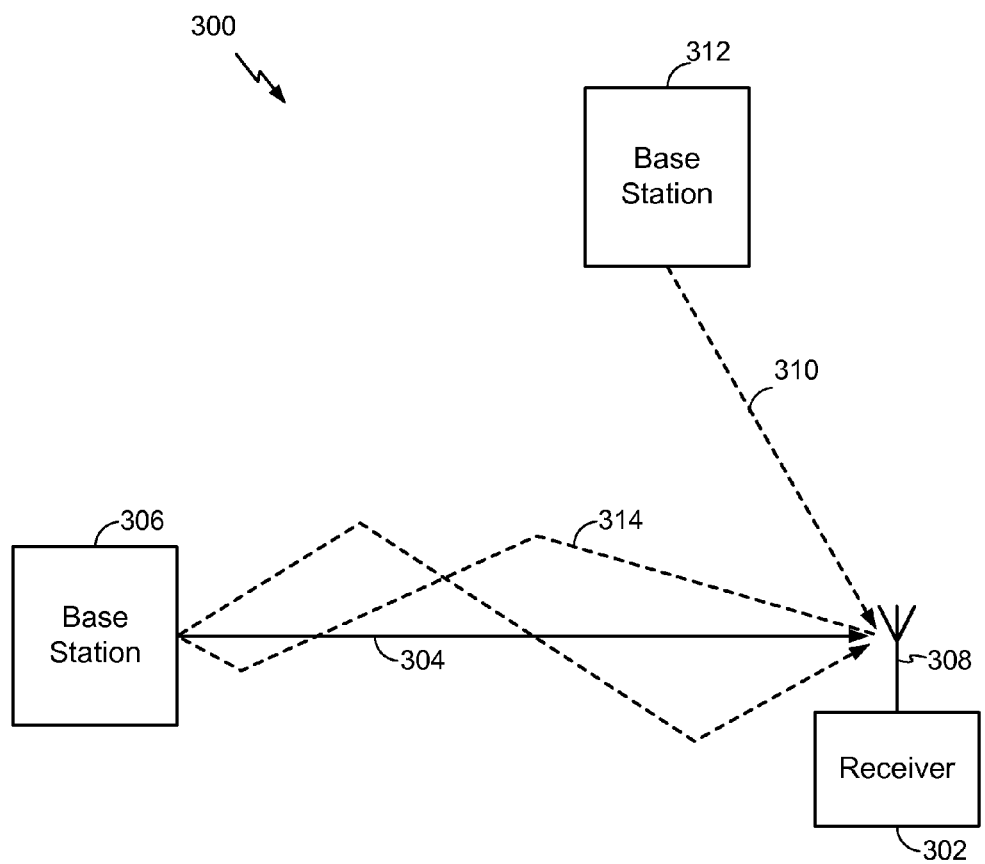
FIG. 3 is a block diagram conceptually illustrating an exemplary communication system in accordance with certain configurations of the present disclosure.

FIG. 3 illustrates a communication system 300 in accordance with one aspect of the subject technology. The communication system 300 may, for example, be a wireless communication system based on the SM standard. A receiver 302 receives a signal 304 transmitted by a base station 306 at an antenna 308 coupled to the receiver 302. However, as illustrated, the signal 304 may suffer from impediments such as co-channel interference (CCI), including a transmission 310 from another base station 312, and inter-symbol interference (ISI) comprising one or more reflections 314 of the signal 304. Accordingly, in certain aspects, the receiver 302 processes the signal 304 to suppress effects of CCI and ISI and recover the data transmitted by the base station 306 by estimating received symbols. While FIG. 3 depicts a single antenna 308 for the sake of clarity, it is contemplated that configurations of the present disclosure also include MIMO transmission systems and the receiver 302 may have multiple receive antennas to receive the signal 304.

Figure 4:
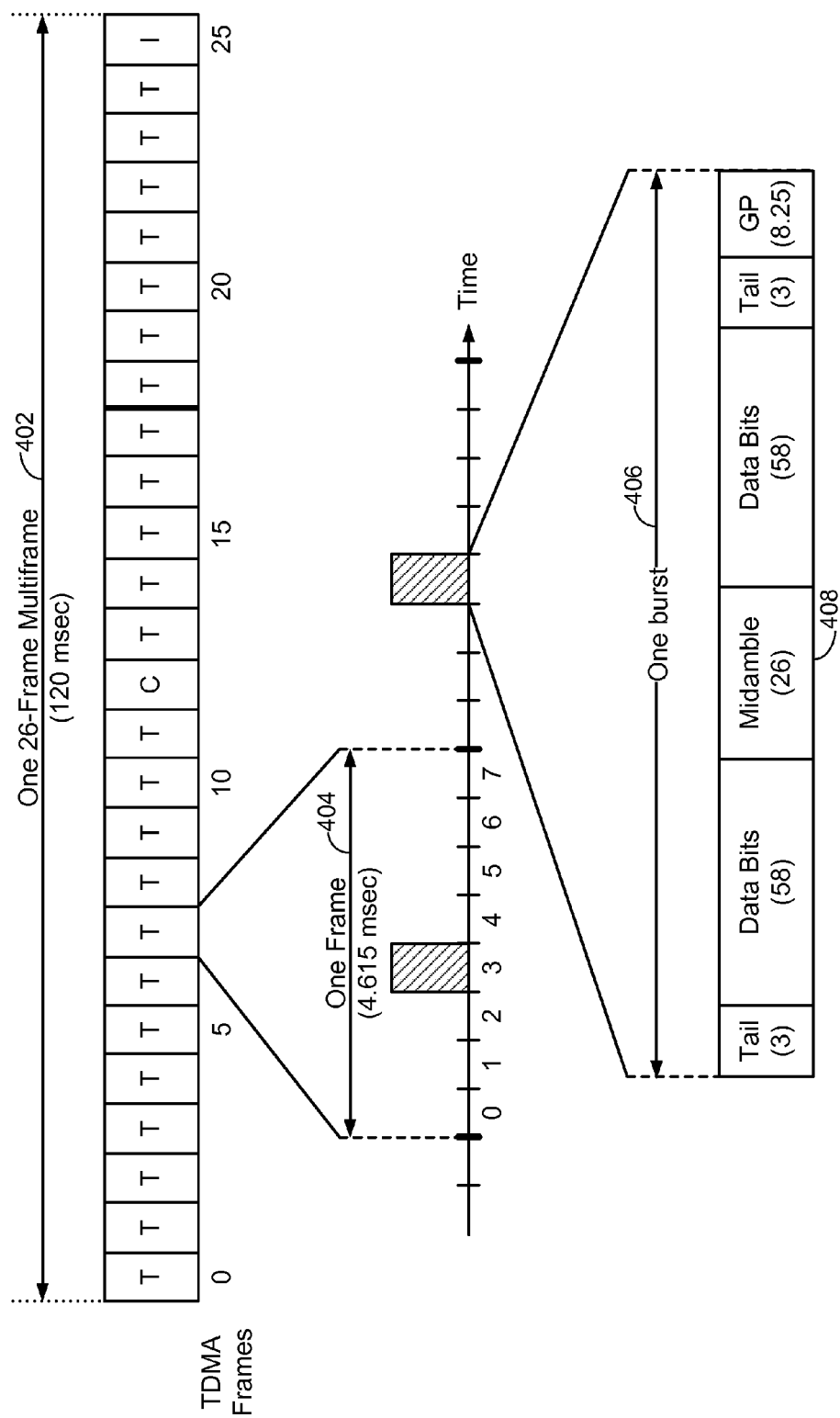
FIG. 4 is illustrates exemplary frame and burst formats in a GSM transmission, in accordance with certain configurations of the present disclosure.

FIG. 4 shows exemplary frame and burst formats in GSM. The timeline for downlink transmission is divided into multiframes. For traffic channels used to send user-specific data, each multiframe, such as exemplary multiframe 402, includes 26 TDMA frames, which are labeled as TDMA frames 0 through 25. The traffic channels are sent in TDMA frames 0 through 11 and TDMA frames 13 through 24 of each multiframe, as identified by the letter "T" in FIG. 4. A control channel, identified by the letter "C," is sent in TDMA frame 12. No data is sent in the idle TDMA frame 25 (identified by the letter "I"), which is used by the wireless devices to measure neighbor base stations.

Each TDMA frame, such as exemplary TDMA frame 404, is further partitioned into eight time slots, which are labeled as time slots 0 through 7. Each active wireless device/user is assigned one time slot index for the duration of a call. User-specific data for each wireless device is sent in the time slot assigned to that wireless device and in TDMA frames used for the traffic channels.

The transmission in each time slot is called a "burst" in GSM. Each burst, such as exemplary burst 406, includes two tail fields, two data fields, a training sequence (or midamble) field, and a guard period (GP). The number of bits in each field is shown inside the parentheses. GSM defines eight different training sequences that may be sent in the training sequence field. Each training sequence, such as midamble 408, contains 26 bits and is defined such that the first five bits are repeated and the second five bits are also repeated. Each training sequence is also defined such that the correlation of that sequence with a 16-bit truncated version of that sequence is equal to (a) sixteen for a time shift of zero, (b) zero for time shifts of .+−.1, .+−.2, .+−.3, .+−.4, and .+−.5, and (3) a zero or non-zero value for other time shifts.

Figure 5:
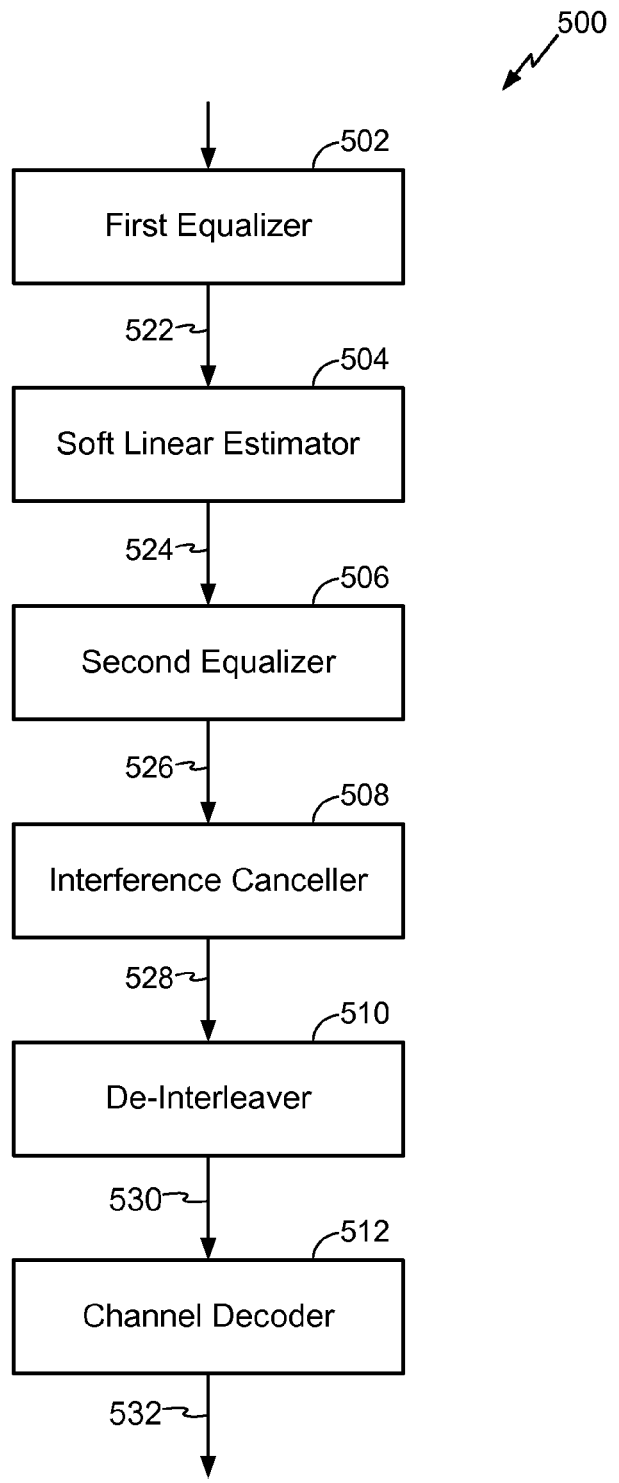
FIG. 5 is a block diagram of a portion of a receiver, in accordance with certain configurations of the present disclosure.

FIG. 5 is a block diagram of a receiver 500, in accordance with certain aspects of the present disclosure. The receiver 500 has a first equalizer section 502, a soft linear estimator section 504, a second equalizer section 506, an interference canceller section 508, a de-interleaver section 510 and a channel decoder section 512.

The first equalizer section 502 is configured to generate a first equalized signal 522 (e.g., a first set of equalized symbols) by canceling CCI and ISI from a first portion of the received signal (e.g., a midamble or a preamble). The first equalizer section 502 also generates a first estimate of the channel (e.g., impulse response coefficients) on which the received burst of symbols was received. The first equalizer section 502 uses, for example, a blind channel estimation algorithm to obtain the first estimate of the channel and to calculate a first set of equalized symbols. The first equalizer section 502 may initially operate upon a received signal corresponding to a short input sequence with a known signal (e.g., midamble) and iteratively process additional received signal samples, as further described below.

The soft linear estimator section 504 is configured to use the first estimate of the channel and the first equalized signal (input 522) to further estimate the channel and further suppress ISI from the first set of equalized symbols and output a second equalized signal (output 524).

The second equalizer section 506 uses the second equalized signal 524 to further equalize the channel and suppress ISI and to produce a first estimate of symbols in the received set of symbol (output 526). The second equalizer section 506 also produces a second estimate of the channel using the second equalized signal (also included in output 526).

The interference canceller section 508 uses the second estimate of the channel and the first estimate of symbols (collectively output 526) to refine the results to improve symbol decisions. The interference canceller section 508 produces hard symbol decisions and log-likelihood ratio (LLR) values associated with the symbol decisions (together shown as output 528). The symbols values from the output 528 are used by further receiver sections such as the de-interleaver 510 to generate data samples 530, which are further decoded by the channel decoder 512 to produce demodulated data 532.

Figure 6:
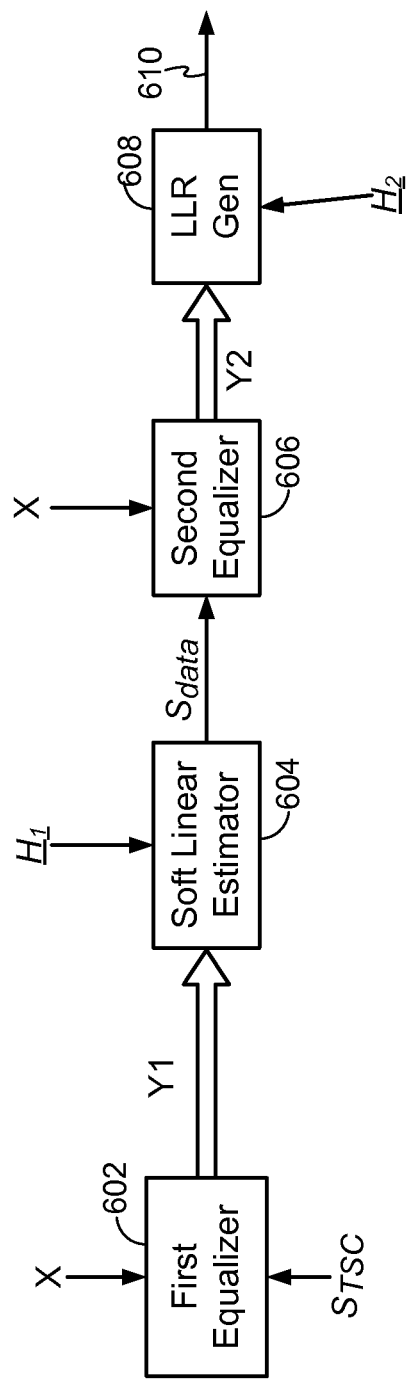
FIG. 6 is a block diagram of a portion of a receiver, in accordance with certain configurations of the present disclosure.

FIG. 6 is a block diagram further illustrating the operation of a receiver in accordance with certain configurations of the present disclosure. According to this aspect of the disclosure, a first equalizer section 602 uses frequency estimates to recover a carrier in a received signal. The first equalizer section 602 also uses timing information to reduce or minimize estimation error incurred during channel equalization calculations. The first equalizer section 602 produces a first equalized signal output Y1 from a set of input samples X received from an earlier receiver section such as an analog-to-digital converter (not shown) and a set of symbols of known values $S_{TSC}$ (e.g., a preamble or a midamble).

A soft linear estimator section 604 receives the estimate of symbols Y1 from the first equalizer section 602. The soft linear estimator section 604 also receives an estimate of the channel $H_1$ (e.g., from the first equalizer section 602). According to aspects of the present disclosure, the soft linear estimator section 604 uses EM-BM algorithms to generates an equalized symbol set $S_{data}$ based on the estimate of the channel $H_1$ and the estimate of symbols Y1.

The equalized symbol set $S_{data}$ is provided to a second equalizer section 606. In certain configurations, the operational principles of the second equalizer section 606 are similar to the operational principles of the first equalizer section 602 as previously described. The second equalizer section 606 computes a set of channel equalized output samples Y2 using the equalized symbol set $S_{data}$ as the training sequence and the input samples X. In certain configurations, the second equalizer section 606 operates upon a training sequence having a larger number of samples compared to the first equalizer section 602. For example, in a GSM network, the second equalizer section 606 is operated on 142 samples, comprising 116 data samples and 26 midamble samples.

A log-likelihood ratio (LLR) generator section 608 produces symbol decisions and log-likelihood ratio values 610 for the symbol decisions. U.S. patent application Ser. No. 12/553,855 filed on Sep. 3, 2009 by Canpolat et al., the disclosure of which is expressly incorporated herein by reference in its entirety, discloses certain configurations of operation of an interference canceller section that generate log-likelihood ratio values 610 consistent with certain configurations of the present disclosure.

To describe certain aspects shown in FIG. 6 in mathematical terms, the received signal samples of signal and interference (noise) can be written as follows. For example, given a set of spatial and temporal samples at a time k:

$$\underline{x}_k = \begin{bmatrix} x_x(1) \\ x_x(2) \\ \vdots \\ x_k(M) \end{bmatrix}, \underline{s}_k = \begin{bmatrix} s_k \\ s_{k-1} \\ \vdots \\ s_{k-\upsilon} \end{bmatrix} \quad (1a)$$

where $s_k$ is the midamble/quasi-midamble signal at time k, $\underline{s}_k$ is a $(\upsilon+1) \times 1$ midamble/quasi-midamble vector, and $\underline{x}_k$ is a $M \times 1$ received midamble/quasi-midamble vector, a set of spatial temporal samples can be defined as $$X_k = \begin{bmatrix} x_k \\ x_{k-1} \\ \vdots \\ x_{k-L} \end{bmatrix}, \quad (1b)$$

where $X_k$ is a $M \times (L+1) \times 1$ vector of spatial temporal samples with a spatial length of M and a temporal length $L+1$, where M is the number of MIMO receive antennas on a receiver, L is the temporal stacking factor used to temporally stack received samples and $\upsilon$ is channel memory, and wherein each of M, L and $\upsilon$ is a positive integer.

In certain configurations, more samples are used for calculating results of channel equalization using MMSE, so that a full column rank for matrix inversion is obtained. In such configurations, the input signal samples are spatially and temporally stacked to obtain the following matrix:

$$\underline{X}_k = [\underline{x}^T(k), \underline{x}^T(k-1) \ldots \underline{x}^T(k-L)]^T \quad (2)$$

Accordingly, a spatial/temporal structured matrix can be constructed, such that $$[X] = [\underline{X}_k, \underline{X}_{k+1}, \ldots, \underline{X}_{k+P-\upsilon}], \quad (3)$$

where [X] is a $M(L+1) \times (P-\upsilon)$ matrix and P is a positive integer representing the length of the midamble or quasi-midamble that represents the length of the burst signal being used in a given iteration. As an example, in a GSM network, P=26. Similar to the data matrix [X], temporal/spatial stacking for the symbols in the received signal gives the symbol matrix [S] in equation (4).

$$[S] = [\underline{S}_k, \underline{S}_{k+1}, \ldots \underline{S}_{k+P-\upsilon}], (\upsilon+1) \times (P-\upsilon) \quad (4)$$

An interference suppression filter that can suppress interference can be expresses as:

$$W = [S][X]^T \{[X][X]^T\}^{-1}, (\upsilon+1) \times M(L+1) \quad (5)$$

Using the expression in equation (5) above, the output Y1 of the first equalizer 602 shown in FIG. 6 can be written as:

$$Y1 = [W][X], (\upsilon+1) \times (P-\upsilon) \quad (6)$$

In certain configurations, the number of midamble samples used to estimate output Y1 may be increased from one iteration to the next, during the iterative process of channel equalization. For example, in certain configurations when the received signal is a GSM signal, the channel equalization calculations can start with using P=26, corresponding to the number of samples of a midamble. In each subsequent iteration, more and more data bits can be included as the channel estimate improves. For example, in certain configurations, one additional sample from each side of the midamble 408 may be added to the symbol matrix [S] shown in equation (4).

Certain aspects of the soft linear estimator 604 shown in FIG. 6 can be explained in mathematical terms as follows. The output Y1 of the first equalizer 602 can be expressed in terms of an equivalent channel:

$$Y1 = [H]_1[S], \quad (7)$$

In equation (7), $[H]_1$ is the equivalent channel estimate, with dimension $(\upsilon+1, \upsilon+1)$ and [S] is the $(\upsilon+1, P-\upsilon)$ reference symbol matrix shown in equation (4). Generally speaking, output Y1 of the first equalizer 602 is a vector of streams of symbol values that has cancelled a significant amount of CCI, but a relatively smaller amount of ISI from the input signal .

The soft linear estimator section 604 calculates a least-squares (LS) estimate of $[H]_1$ using a soft linear algorithm.

Certain aspects of the soft linear algorithm, implemented at the soft linear estimator section 604, can be explained in mathematical terms as follows.

The output Y1 of the first equalizer 602, as described above, can be represented as follows:

$$y_t = \tilde{h}^T s_t + n_t \quad (8)$$

$$y_t = \sum_{k=0}^{v} \tilde{h}_k s_{t-k} + n$$

$$= f(s_t, \tilde{h}) + n$$

$$= f(s_t, s_{t-1}, \ldots s_{t-v}, \tilde{h}) + n$$

$$y_t = f(s_t, q_t, \tilde{h}) + n$$

In Equation (9), $\tilde{h}$ represents residual ISI and $n_t$ represents noise which may be either white noise or colored noise. The term $s_t$ represents an incoming symbol at time t and the term $q_t$ represents the channel memory state at time t. Equation (8) may be modeled by representing an entire shift register content as a state $U_t=(s_t, q_t)=\xi_i$. For a number N of distinct states in a model, the set of shift register states can be represented as $\xi=\{\xi_1, \xi_2, \ldots, \xi_N\}$.

In a channel hidden Markov model (HMM) the entire parameter set may be represented as:

$$\lambda=\{A,B,\pi\} \quad (9)$$

where A represents all transition probabilities; and $B=\{b_j\}$ is a set of Gaussian probability distribution functions (PDFs) (eq. 10), with mean ($\mu=\{\mu_j\}$) and variance ($\sigma^2$). Therefore, $\lambda=\{A, \pi, B(\mu, \sigma2)\}$. For T received noisy samples $\underline{y}$, the HMM parameter log likelihood function is $$\Lambda(\lambda)=\ln(p(\underline{y}|\lambda)) \quad (10)$$

The conditional (a posteriori) probability density function (Apop) of observing sample $y_t$ (the conditional probability densities of channel output are mutually independent) can be represented in the following equation.

$$p(y_t | U_t = \xi_i) = \frac{1}{2\pi\sigma^2} \exp\left(-\frac{1}{2\sigma^2}(y_t - \mu_i(\underline{h}, \xi_i))^2\right), \quad (11)$$

where $$\mu_i(\underline{h}, \xi_i) = \underline{h}^T \xi_i$$

Symbol estimation from aposteriori probability can be performed in the following manner wherein $p(U_t=\xi_i|\underline{y},\lambda^{(k)})$ is the aposteriori probability of shift register content. Iteratively improving estimates of $\lambda$ improves an auxiliary function Q used in the HMM and EM-BM algorithms and also increases the aposteriori probability as well as likelihood.

$$p(s_t = 1 | \underline{y}, \lambda^{(k)}) = \sum_{\forall U_t \text{ with } s_t=+1} p(U_t = \xi_i | \underline{y}, \lambda^{(k)}) \quad (12)$$

$$= \sum_{\forall U_t \text{ with } s_t=+1} p(U_t = (s_t = 1, S_i) | \underline{y}, \lambda^{(k)})$$

$$= \sum_{q_t} p(U_t = (s_t = 1, S_i) | \underline{y}, \lambda^{(k)})$$

In equation (12), the term $q_t$ represents the channel memory state at time t as described above with reference to equation (8).

Figure 7:
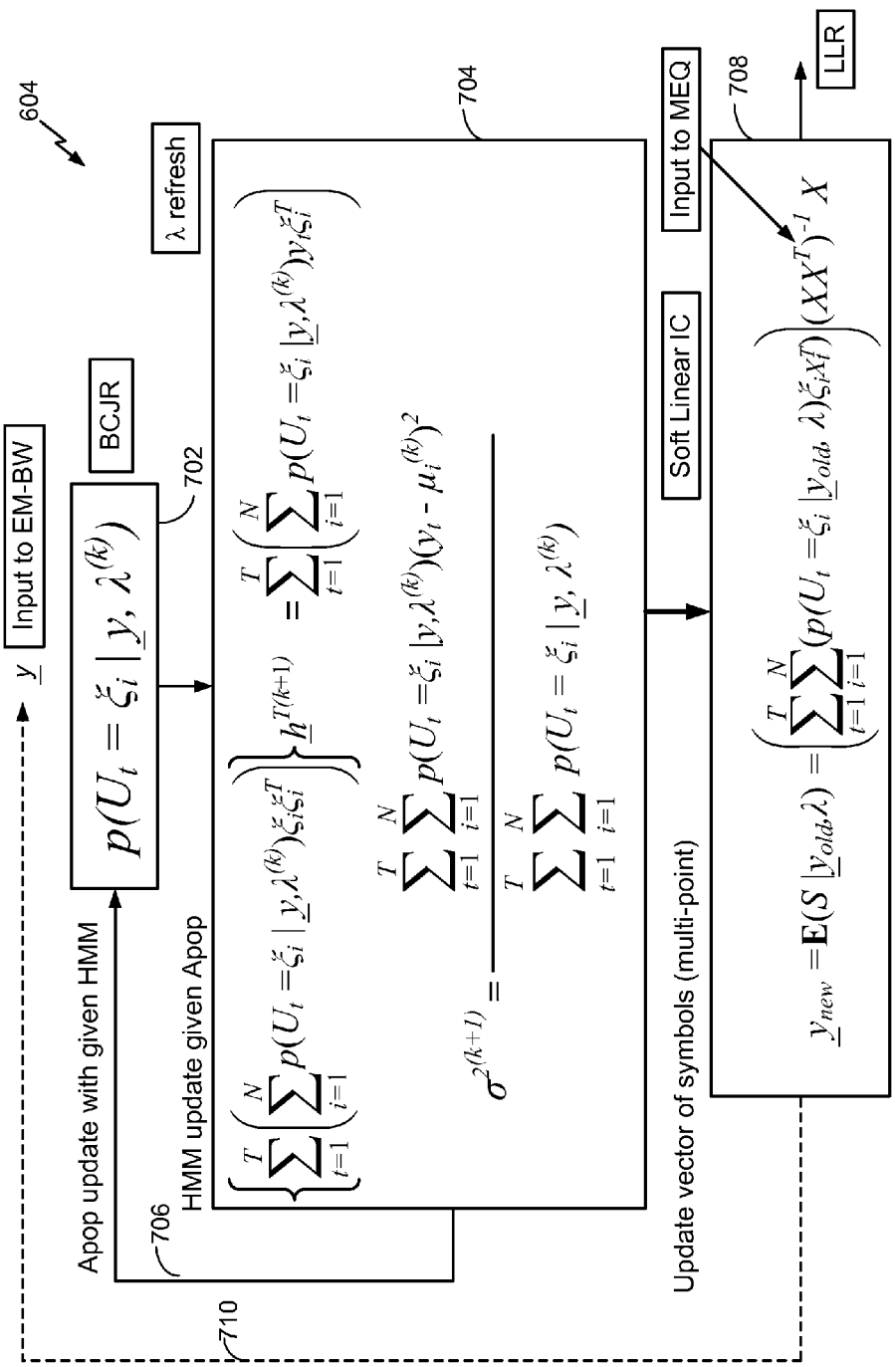
FIG. 7 is a block diagram of a soft linear estimator section, in accordance with certain configurations of the present disclosure.

As previously discussed, the soft linear estimator 604 performs symbol estimation using the EM-BW algorithm. Referring to FIG. 7, certain aspects of the EM-BW algorithm, implemented at the soft linear estimator 604 can be explained in mathematical terms as follows.

An Apop generation block 702, includes an algorithm for maximum a-posteriori decoding, such as the well known Bahl, Cocke, Jelinek and Raviv (BCJR) algorithm (Equation 2) based on the input symbol y.

$$p(U_t=\xi_i|\underline{y},\lambda^{(k)}) \quad (13)$$

An HMM block 704 receives the Apop from Apop generation block 702 and updates the Apop using the EM-BW algorithm as set forth in Equation 3 and Equation 4, for example.

$$\left\{\sum_{t=1}^{T}\left(\sum_{i=1}^{N} p(U_t = \xi_i | \underline{y}, \lambda^{(k)})\xi_i\xi_i^T\right)\right\}\underline{h}^{T(k+1)} = \quad (14)$$

$$\sum_{t=1}^{T}\left(\sum_{i=1}^{N} p(U_t = \xi_i | \underline{y}, \lambda^{(k)})y_t\xi_i^T\right)$$

$$\sigma^{2(k+1)} = \frac{\sum_{t=1}^{T}\sum_{i=1}^{N} p(U_t = \xi_i | \underline{y}, \lambda^{(k)})(y_t - \mu_i^{(k)})^2}{\sum_{t=1}^{T}\sum_{i=1}^{N} p(U_t = \xi_i | \underline{y}, \lambda^{(k)})} \quad (15)$$

The HMM block 704 provides updated HMM parameters that are used in a next iteration of the BCJR algorithm in the Apop generation block 702. The BCJR algorithm and the EM-BW algorithm are repeated iteratively in an inner loop process 706 until the inner loop process 706 converges or until a first predetermined condition occurs.

Upon completion of the iterations in the inner loop process 706, the algorithm set forth in Equation 5 generates an updated vector of multi-point symbols (y_new) in a symbol update block 708. The updated vector of multi-point symbols (y_new) is iteratively fed back to the Apop generation block 702 in an outer loop process 710 until the outer loop process 710 converges or until a second predetermined condition occurs.

$$\underline{y}_{new} = E(S | \underline{y}_{old}, \lambda) = \left(\sum_{t=1}^{T}\sum_{i=1}^{N} (p(U_t = \xi_i | \underline{y}_{old}, \lambda)\xi_i X_t^T)\right)(XX^T)^{-1}X \quad (16)$$

The output estimates obtained by solving equation 16 are then hard-sliced to obtain hard estimates of symbols.

Figure 8:
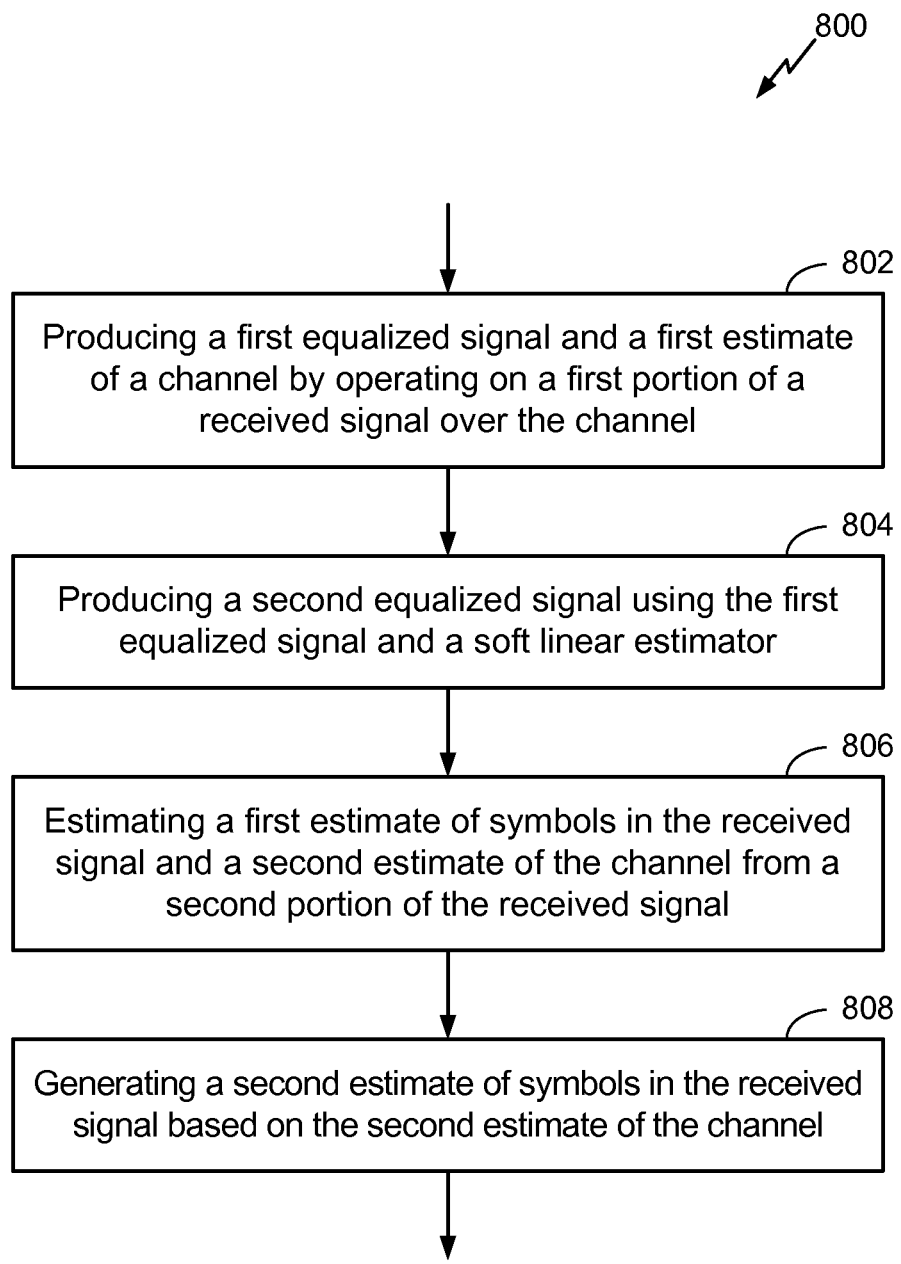
FIG. 8 is a flow chart of an exemplary decoding process, in accordance with certain configurations of the present disclosure.

FIG. 8 is a flow chart of an exemplary decoding process 800, in accordance with certain configurations of the present disclosure. The decoding process 800 produces demodulated data samples from an input signal received over a channel. In certain configurations, the decoding process 800 is implemented at a receiver, such as the receiver 302 shown in FIG. 3. The decoding process 800 produces a first equalized signal and a first estimate of the channel by operating on a first portion of a received signal received over a channel of block 802. In certain configurations, the block 802 is performed as previously discussed with respect to the first equalizer section

502. In such configurations, the first equalized signal is the signal $\tilde{x}_1$. Similarly, the first estimate of the channel is $H_1$ and the first portion of the received signal comprises the midamble.

The decoding process 800 also produces a second equalized signal using the first equalized signal and a soft linear estimator at block 804. In certain configurations, the block 804 is performed as previously discussed with respect to the soft linear estimator section 504 shown in FIG. 5. In such configurations, the second equalized signal is the output $\tilde{s}_{opt}$.

The decoding process 800 generates a first estimate of symbols in the received signal and a second estimate of the channel from a second portion of the received signal. In certain configurations, the block 806 is performed as previously discussed with respect to the second equalizer section 506 shown in FIG. 5. The decoding process 800 further generates a second estimate of symbols in the received signal based on the second estimate of the channel of block 808. In certain configurations, the block 808 is performed as previously discussed with respect to the interference canceller section 508.

Referring to FIG. 2, in one configuration, the eNodeB 110 is configured for wireless communication including means for producing a first equalized signal and a first estimate of a channel by operating on a first portion of a received signal received over a channel. In one aspect, the means for producing the first equalized signal may be the receive processor 238, the control processor 240 and the memory 242 configured to perform the functions recited by the means for producing the first equalized signal. The eNodeB 110 is also configured to include a means for producing a second equalized signal using the first equalized signal and a soft linear estimator. In one aspect, the means for producing the second equalized signal may be the receive processor 238, the control processor 240 and the memory 242 configured to perform the functions recited by the means for producing the second equalized signal.

The eNodeB 110 is also configured to include a means for estimating a first estimate of symbols in the received signal and a second estimate of channel from a second portion of the received signal. In one aspect, the means for estimating the first estimate of symbols may be the receive processor 238, the control processor 240 and the memory 242 configured to perform the functions recited by the means for estimating the first estimate of symbols. The eNodeB 110 is also configured to include a means for generating a second estimate of symbols in the received signal based on the second estimate of the channel. In one aspect, the means for generating the second estimate of signals may be the receive processor 238, the control processor 240 and the memory 242 configured to perform the functions recited by the means for estimating the first estimate of symbols.

In one configuration, the UE 120 is configured for wireless communication including means for processing. In one aspect, the means for processing may be the receive processor 258, the control processor 280 and/or the memory 282 configured to perform the functions recited by the processing means. The UE 120 is also configured to include a means for performing a soft linear estimate. In one aspect, the performing means may be the receive processor 258, the control processor 280 and/or the memory 282 configured to perform the functions recited by the performing means. In another aspect, the aforementioned means may be any module or any apparatus configured to perform the functions recited by the aforementioned means.

Figure 9:
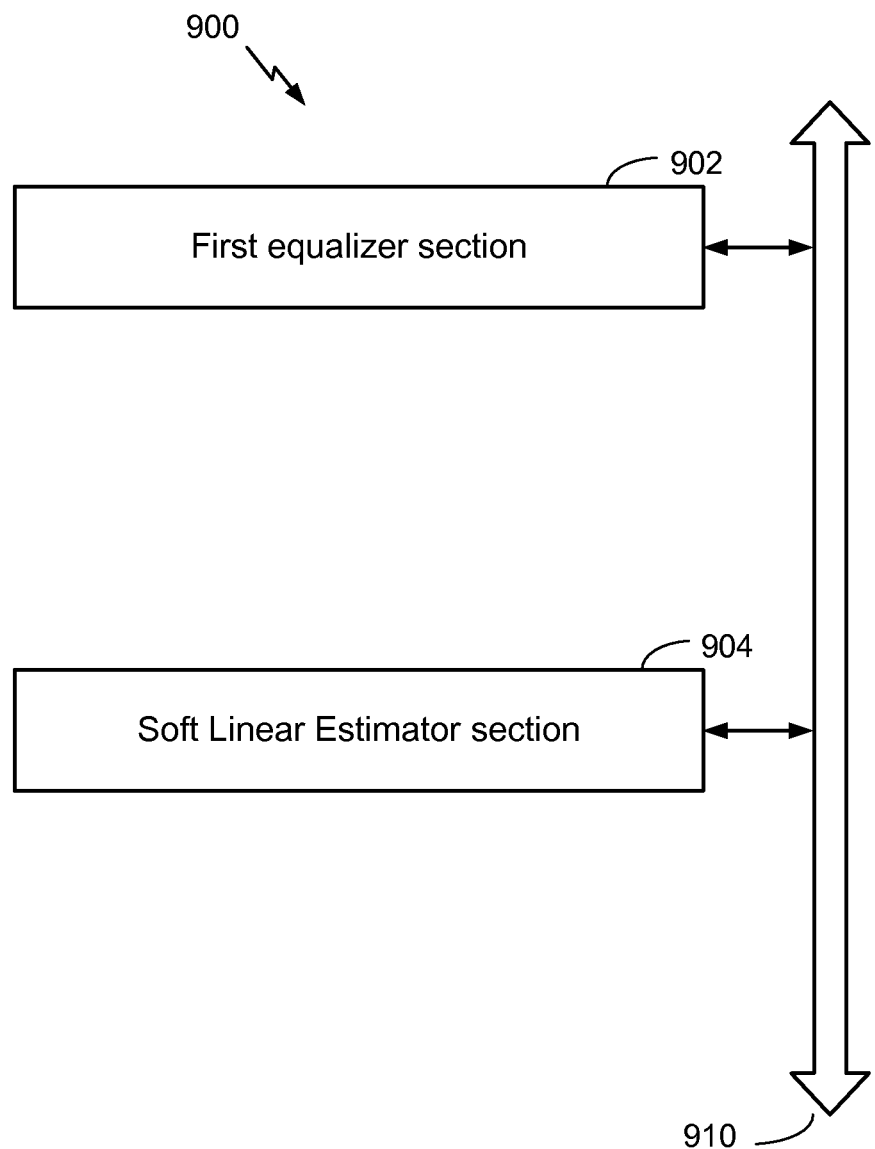
FIG. 9 is a block diagram illustrating an apparatus with which certain aspects of the subject technology may be implemented in accordance with certain configurations of the present disclosure.

FIG. 9 is a block diagram that illustrates exemplary receiver system 900 in accordance with certain configurations of the subject technology. The receiver system 900 has a first equalizer section 902 configured to process a first portion of a received to produce a first equalized signal and a first estimate of a channel. The receiver system also has a soft linear estimator section 904 configured to perform soft linear estimation on the first equalized signal to produce a second equalized signal. As depicted in FIG. 9, the modules 902 and 904 are in communication via a communication module 910.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A communication receiver comprising:
   a first equalizer section configured to operate on a first portion of a received signal received over a channel to produce a first equalized signal and a first estimate of the channel;
   an inner loop soft linear estimator section comprising a Hidden Markov Model (HMM) estimator configured to perform Estimation Maximization/Baum Welsh processing of the first equalized signal to produce an updated vector upon completion of the Estimation Maximization/Baum Welsh processing; and
   an outer loop equalizer section configured to operate on the updated vector to produce a first estimate of symbols in the received signal and a second estimate of the channel, the outer loop equalizer section configured to iteratively feedback the updated vector to the inner loop soft linear estimator.

2. The communication receiver of claim 1, in which the first portion of the received signal comprises a known signal.

3. The communication receiver of claim 2, in which the known signal comprises a midamble.

4. A signal reception method, comprising:
   processing a first portion of a received signal received over a channel to produce a first equalized signal and a first estimate of the channel;
   performing an inner loop process comprising Estimation Maximization/Baum Welsh processing on the first equalized signal using a Hidden Markov Model (HMM) estimator to produce an updated vector upon completion of the Estimation Maximization/Baum Welsh processing; and
   performing an outer loop process comprising operating on the updated vector to produce a first estimate of symbols in the received signal and a second estimate of the channel, the outer loop process further comprising iteratively providing the updated vector as input to the inner loop process.

5. The signal reception method of claim 4, in which the first portion of the received signal comprises a known signal.

6. The signal reception method of claim 5, in which the known signal comprises a midamble.

7. A signal reception apparatus, comprising:
   means for processing a first portion of a received signal received over a channel to produce a first equalized signal and a first estimate of the channel;
   means for performing an inner loop process comprising Estimation Maximization/Baum Welsh processing on the first equalized signal using a Hidden Markov Model (HMM) estimator to produce an updated vector upon completion of the Estimation Maximization/Baum Welsh processing; and
   means for performing an outer loop process comprising operating on the updated vector to produce a first estimate of symbols in the received signal and a second estimate of the channel, the outer loop process further comprising iteratively providing the updated vector as input to the inner loop process.

8. The signal reception apparatus of claim 7, in which the first portion of the received signal comprises a known signal.

9. The signal reception apparatus of claim 8, in which the known signal comprises a midamble.

10. A system for wireless communication, comprising:
    a memory; and
    at least one processor coupled to the memory, the at least one processor being configured:
    to process a first portion of a received signal received over a channel to produce a first equalized signal and a first estimate of the channel;
    to perform an inner loop process comprising Estimation Maximization/Baum Welsh processing on the first equalized signal using a Hidden Markov Model (HMM) estimator to produce an updated vector upon completion of the Estimation Maximization/Baum Welsh processing; and
    to perform an outer loop process comprising operating on the updated vector to produce a first estimate of symbols in the received signal and a second estimate of the channel, the outer loop process further comprising iteratively providing the updated vector as input to the inner loop process.

11. The system of claim 10, in which the first portion of the received signal comprises a known signal.

12. The system of claim 11, in which the known signal comprises a midamble.

13. A communication receiver comprising:
    a first equalizer section configured to operate on a first portion of a received signal received over a channel to produce a first equalized signal and a first estimate of the channel;
    an inner loop section configured to perform iterative estimation of the first equalized signal to produce an updated vector upon completion of the iterative estimation; and
    an outer loop section configured to operate on the updated vector to produce a first estimate of symbols in the received signal and a second estimate of the channel, the outer loop equalizer section configured to iteratively feedback the updated vector to the inner loop section.

* * * * *